United States Patent
Kobayashi et al.

[11] Patent Number: 6,124,908
[45] Date of Patent: Sep. 26, 2000

[54] LIQUID CRYSTAL ELEMENT

[75] Inventors: Nobuyuki Kobayashi, Kobe; Takuji Hatano, Suita; Masakazu Okada, Takatsuki; Naoki Masazumi, Amagasaki, all of Japan

[73] Assignee: Minolta Co., Ltd., Osaka, Japan

[21] Appl. No.: 08/872,202

[22] Filed: Jun. 10, 1997

[30] Foreign Application Priority Data

| Jun. 10, 1996 | [JP] | Japan | 8-147355 |
| Jun. 20, 1996 | [JP] | Japan | 8-159803 |
| Jun. 20, 1996 | [JP] | Japan | 8-159925 |

[51] Int. Cl.$^7$ ................................................. G02F 1/1335

[52] U.S. Cl. ........................... 349/106; 349/185; 349/86

[58] Field of Search ............................. 349/106, 185, 349/86

[56] References Cited

U.S. PATENT DOCUMENTS

| 5,058,997 | 10/1991 | Dickerson et al. | 349/106 |
| 5,437,811 | 8/1995 | Doane et al. | 252/299.01 |

*Primary Examiner*—Robert H. Kim
*Attorney, Agent, or Firm*—Sidley & Austin

[57] ABSTRACT

A liquid crystal element has a pair of substrates at least one of which is transparent, and a composite layer, which is retained between said pair of substrates, comprising a transparent resin matrix and a liquid crystal material having cholesteric characteristics.

(1) In the liquid crystal element, a contact angle between the liquid crystal material and the resin used in the transparent resin matrix is 30° or less.

(2) In the liquid crystal element, said liquid crystal material reflects a light component having a wavelength in a range from 1.0 $\mu$m to 1.5 $\mu$m in a planar state.

(3) In the liquid crystal element, said transparent resin matrix is formed by polymerizing of a mixture of compound having the following formula (1) and multi-functional acrylate derivative,

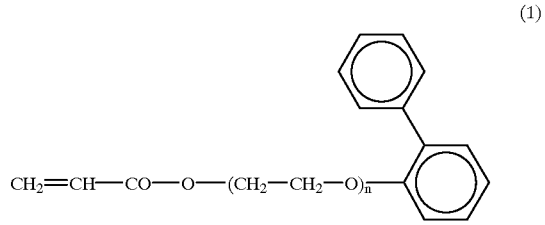

(1)

wherein n is a natural number from 1 to 2.

11 Claims, 8 Drawing Sheets

LIQUID CRYSTAL ELEMENT

BACKGROUND OF THE INVENTION

1. Field of the Invention

The present invention relates to a liquid crystal element having a composite film or layer formed of liquid crystal and resin.

2. Description of the Related Art

In recent years, a liquid crystal element having a composite material formed of liquid crystal and resin has been proposed as a kind of liquid crystal element used for displaying characters and images. For example, U.S. Pat. No. 5,437,811 has taught a liquid crystal element in which a composite layer is retained between a pair of plates. The composite film or layer is formed of chiral nematic liquid crystal exhibiting a cholesteric phase and dispersed in a resin matrix.

The liquid crystal element, in which the liquid crystal exhibiting the cholesteric phase is dispersed in the resin matrix, utilizes selective reflection of incident light by the liquid crystal, so that it does not require a polarizer, and therefore can perform bright reflective display.

Since the liquid crystal element, in which the liquid crystal exhibiting the cholesteric phase is dispersed in the resin matrix, has a memory effect, it does not require a memory element such as TFT, MIM or the like, and therefore can perform display at high resolution.

Under a no field condition, the liquid crystal material of this element selectively attains a planar orientation or state, in which helical axes of domains consisting of liquid crystal molecules are aligned perpendicularly to the substrates, or a focal-conic orientation or state, in which helical axes of domains consisting of liquid crystal molecules are directed irregularly. When a relatively high voltage in a pulse form is applied to the composite layer in the focal-conic state, the liquid crystal molecules align to a direction of the voltage application and attain the homeotropic state. Then, by ceasing the voltage application, the liquid crystal molecules form domains again, and attain the planar state. Alternatively, when a relatively low voltage in a pulse form is applied to the composite layer in the planar state, the liquid crystal molecules align to a direction of the voltage application and attain the homeotropic state. Then, by ceasing the voltage application, the liquid crystal molecules form domains again, and attain the focal-conic state.

It is considered that the bistability of these two states is achieved by the fact that the resin restricts movement of the liquid crystal.

The liquid crystal exhibiting the cholesteric phase selectively reflects light beams of a wavelength corresponding to a product of a helical pitch length and an average refractive index of the liquid crystal, when it is in the planar orientation. By setting the selective reflection wavelength in a visible range, therefore, the liquid crystal in the planar orientation can display an arbitrary color. When the above setting is employed, the liquid crystal in the focal-conic orientation exhibits a transparent appearance. Therefore, display in a colored state and a transparent state can be selectively achieved in accordance with the selective reflection wavelength. For example, display in a colored state corresponding to the selective reflection wavelength and a black state can be performed by utilizing a black background color.

When the selective reflection wavelength of the liquid crystal is set in the invisible range such as an infrared range, the liquid crystal in the planar orientation transmits the visible rays and therefore exhibits a transparent appearance. In the focal-conic orientation, it scatters the incident rays and therefore exhibits a white opaque appearance. Therefore, monochrome display can be performed by utilizing a black background color. Also, display in an arbitrary colored state and a white state can be performed by utilizing the arbitrary background color.

However, if the selective reflection wavelength is set in the invisible range such as an infrared range, such a problem arises that a transmittance or transmission factor of visual rays in the planar orientation decreases with increase in helical pitch length, resulting in reduction in contrast.

The liquid crystal having the composite layer, in which liquid crystal exhibiting a cholesteric phase is dispersed in the resin matrix, has transmittance in the planar and focal-conic orientations as well as stability in these orientations which depend on the kind of the liquid crystal (kinds and a mixture rate of liquid crystal materials in the case where the liquid crystal exhibiting a cholesteric phase is formed of a mixture of two or more kinds of liquid crystal materials) as well as kinds of the resin or the like. However, the liquid crystal element exhibiting a sufficient contrast between the planar orientation and focal-conic orientation has not yet been developed.

SUMMARY OF THE INVENTION

An object of the invention is to provide a liquid crystal element capable of bright display.

Another object of the invention is to provide a liquid crystal element capable of display at high resolution.

Still another object of the invention is to provide a liquid crystal element having memory effect and providing a high contrast.

The invention provides a liquid crystal element (a liquid crystal element of first type) comprising a pair of substrates at least one of which is transparent, and a composite layer which is retained between said pair of substrates comprising a transparent resin matrix and a liquid crystal material having cholesteric characteristics, wherein a contact angle between the liquid crystal material and the resin used in the transparent resin matrix is 30° or less.

The invention provides a liquid crystal element (a liquid crystal element of second type) comprising a pair of substrates at least one of which is transparent, and a composite layer which is retained between said pair of substrates comprising a transparent resin matrix and a liquid crystal material having cholesteric characteristics, wherein said liquid crystal materal reflects a light component having a wavelength in a range from 1.0 $\mu$m to 1.5 $\mu$m in a planar state, in other words the selective reflection wavelength of said liquid crystal material is in a range from 1.0 $\mu$m to 1.5 $\mu$m.

The invention provides a liquid crystal element (a liquid crystal element of third type) comprising a pair of substrates at least one of which is transparent, and a composite layer which is retained between said pair of substrates comprising a transparent resin matrix and a liquid crystal material having cholesteric characteristics, wherein said transparent resin matrix is formed by polymerizing of a mixture of compound having the following formula (1) and multi-functional acrylate derivative,

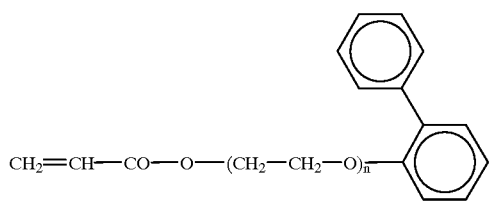

(1)

wherein n is natural number from 1 to 2.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
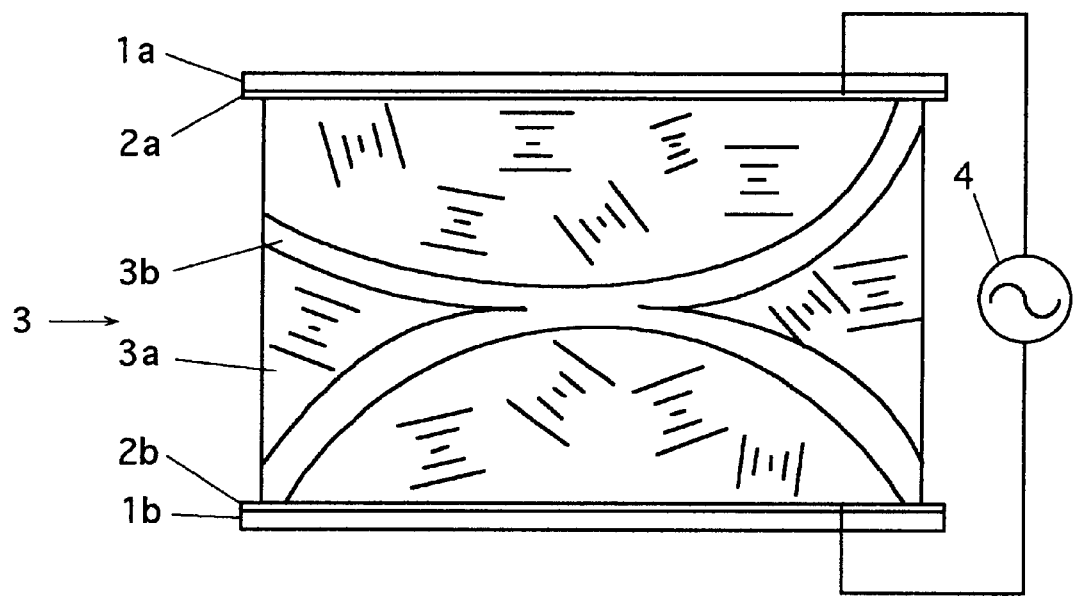
FIG. 1(A) schematically shows an example of an element structure which can be employed commonly in liquid crystal elements of first, second and third type according to the invention.

A liquid crystal element of an embodiment of the invention (a liquid crystal element of first embodiment) has a pair of substrates including at least one transparent substrate, and a composite layer retained between these substrates. The composite layer includes a transparent resin matrix and a liquid crystal material having cholesteric characteristics (in other words, a liquid crystal material exhibiting a cholesteric phase). Resin used in the transparent resin matrix and the liquid crystal material define a contact angle of 30° or less between them.

The above contact angle between the resin and the liquid crystal material is defined in such a state that a droplet of the liquid crystal material is located on a surface of a solid body made of the resin in the air. In other words, it means one of angles defined between a tangent line of the droplet of the liquid crystal material, which extends through a contact point among air, liquid crystal material and resin, i.e., three phases, in such a situation that a droplet of the liquid crystal material is located on a surface of the solid body made of the resin in the air, and particularly means the angle including the droplet of the liquid crystal material.

According to the liquid crystal element of the first embodiment, the resin used in the transparent resin matrix and the liquid crystal material having cholesteric characteristics provide a contact angle of 30° or less between them. Thus, the wettability between them is relatively good, so that the liquid crystal material in the planar orientation or state and therefore in the transparent state exhibits an improved transmittance and therefore a high contrast.

The liquid crystal material having cholesteric characteristics may be, for example, cholesteric liquid crystal material or chiral nematic liquid crystal material made of nematic liquid crystal material and chiral ingredient added thereto. In particular, the chiral nematic liquid crystal material is preferable because it provides advantages such as easy setting of the helical pitch length.

A typical example of the liquid crystal material may have such properties that it reflects a light component of a wavelength in an infrared range, and in other words, may have a selective reflection wavelength in the infrared range. The liquid crystal material is, however, not restricted thereto. The liquid crystal material having the above properties can allow transmission of visible rays and therefore be transparent when the liquid crystal material is in the planar orientation. According to the liquid crystal element of the first embodiment described above, a high contrast can be achieved even if the selective reflection wavelength of the liquid crystal material is in the infrared range.

A weight ratio between the liquid crystal material and the transparent resin matrix is preferably in a range from 9:1 to 7:3. This further improves the contrast. If the rate of resin matrix is excessively high, it has an excessively fine matrix structure, so that the transmittance of the liquid crystal material in the planar orientation desirably lowers.

A liquid crystal element of another embodiment of the invention (a liquid crystal element of second embodiment) has a pair of substrates including at least one transparent substrate, and a composite layer retained between the substrates. The composite layer comprises a transparent resin matrix and a liquid crystal material having cholesteric characteristics (in other words, a liquid crystal material exhibiting a cholesteric phase). The selective reflection wavelength of the liquid crystal material is in a range from 1.0 μm to 1.5 μm in the infrared range.

According to the liquid crystal element of the second embodiment, the selective reflection wavelength of the liquid crystal material having cholesteric characteristics is in a range from 1.0 μm to 1.5 μm in the infrared range. Therefore, the liquid crystal element thereof exhibits a transparent appearance when liquid crystal molecules are in the planar orientation, and exhibits a white opaque appearance when liquid crystal molecules are in the focal-conic orientation. Also, a good contrast can be achieved between the transparent state and the scattering opaque state.

The liquid crystal material havng the cholesteric characteristics may be, for example, cholesteric liquid crystal material or chiral nematic liquid crystal material made of nematic liquid crystal material and chiral ingredient added thereto. In particular, the liquid crystal material may desirably be the chiral nematic liquid crystal material including tolane liquid crystal material having nematic characteristics, pyrimidine liquid crystal material having nematic characteristics, cyanobiphenyl liquid crystal material having nematic characteristics and chiral ingredient. This further improves the contrast.

In the liquid crystal elements of the first and second embodiments of the invention, the transparent resin matrix may have a three-dimensional continuous mesh structure.

The resin used in the transparent resin matrix is preferably photo-curing resin. The photo-curing resin allows easy control of polymerization. In this case, the composite layer may be produced by irradiating light to the mixture of polymerizable monomer or/and oligomer of the photo-curing resin and the liquid crystal material and thereby causing phase separation.

A liquid crystal element of still another embodiment of the invention (a liquid crystal element of third embodiment) has a pair of substrates including at least one transparent substrate, and a composite layer retained between said substrates. The composite layer includes a transparent resin matrix and a liquid crystal material having cholesteric characteristics (in other words, a liquid crystal material exhibiting a cholesteric phase). The transparent resin matrix is formed by polymerizing a mixture of compound having the following formula (1) and multi-functional acrylate derivative.

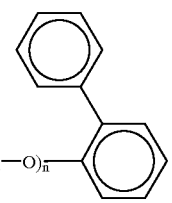

(1)

$CH_2$=CH—CO—O—$(CH_2$—$CH_2$—O$)_{\overline{n}}$ wherein n is natural number from 1 to 2.

According to the liquid crystal element of the third embodiment, since the transparent resin matrix in the composite layer is formed by polymerization of the mixture, a good contrast can be achieved between the planar orientation state and the focal-conic orientation state.

The liquid crystal material having cholesteric characteristics may be, for example, cholesteric liquid crystal material or chiral nematic liquid crystal material made of nematic liquid crystal material and chiral ingredient added thereto. In particular, if the chiral nematic liquid crystal material is used, the nematic liquid crystal material mixed with the chiral ingredient may desirably contain tolane liquid crystal material having nematic characteristics and pyrimidine liquid crystal material having nematic characteristics, and additionally contain one or more of cyanobiphenyl liquid crystal material having nematic characteristics, phenylcyclohexane (PCH) liquid crystal material having nematic characteristics and cyclohexylcyclohexane (CCH) liquid crystal material having nematic characteristics. This further improves the contrast.

The compound expressed by the foregoing formula (1) and the multi-functional acrylate derivative may be monomer or/and oligomer.

In the liquid crystal element of the third embodiment of the invention, a ratio by weight between the liquid crystal material having cholesteric characteristics and the mixture of the foregoing compound and the multi-functional acrylate derivative is desirably in a range from about 88:12 to about 80:20. If the rate of the foregoing mixture is large, the composite layer has a larger strength. However, if the rate of the foregoing mixture is excessively large, each space occupied by the liquid crystal material is excessively small, so that the liquid crystal molecules which can respond to a voltage and, in other words, are not anchored in the transparent resin matrix decrease in number, resulting in reduction in contrast.

The weight ratio between the compound and the multi-functional acrylate derivative in the mixture is desirably in a range from about 90:10 to about 80:20. The reason of the small rate of the multi-functional acrylate derivative is as follows. Since the multi-functional acrylate derivative functions as a cross linking agent during polymerization, the more multi-functional acrylate derivative improves the strength of the composite layer. However, an excessively large amount of multi-functional acrylate derivative excessively reduces each space occupied by the liquid crystal material, so that the liquid crystal molecules which can respond to a voltage and, in other words, are not anchored in the transparent resin matrix decrease in number, resulting in a reduction in contrast.

In the liquid crystal elements of the first, second and third embodiments of the invention, the foregoing substrate holding the composite layer may be selected from various kinds of members such as a flexible plate member, a plate member which is short of flexibility or a flexible film, and more specifically may be a glass plate, a polyethylene terephthalate (PET) film or the like. Only one of the paired substrates may be a plate member having a hardness which allows holding of the composite layer, and the other may be a member such as a film for protecting the composite layer.

It is usually desired that spacers are arranged between the paired substrates for keeping the thickness of the composite layer in a fixed thickness. The spacers may be fiber-like members such as glass fibers, glass beads, polymer beads or the like.

The liquid crystal elements of the first, second and third embodiments may be driven, e.g., by application of a voltage. A method of applying the voltage to the composite layer may be, for example, a method of applying the voltage across conductive films arranged on the paired substrates, respectively, a method of applying the voltage across a pair of externally arranged electrodes between which the liquid crystal element according to the invention is inserted, or a method of applying the voltage across a conductive film arranged on one of the substrates and an electrode (e.g., a pen electrode or an erasing electrode) arranged in the exterior of another of the substrates.

According to the liquid crystal elements of the first, second and third embodiments, display is performed by utilizing selective reflection of incident rays by the liquid crystal material having cholesteric characteristics. Therefore, the liquid crystal element does not require a polarizer, and can perform bright display. Since the liquid crystal material is present together with the transparent resin matrix, the liquid crystal element has memory effect, so that the liquid crystal element does not require a memory element such as a TFF or a MIM, and can perform display at high resolution.

Examples of the liquid crystal elements of the first, second and third embodiments of the invention will be described below with reference to the drawings.

FIG. 1(A) schematically shows an example of a liquid crystal element structure which can be employed commonly in liquid crystal elements of the first, second and third embodiments. In this liquid crystal element, a composite layer 3 is retained between a pair of transparent plates 1a and 1b opposed to each other. Transparent conductive films 2a and 2b are formed on inner surfaces of the plates 1a and 1b, respectively. The composite layer 3 is present between the transparent conductive films 2a and 2b, and is made of a transparent resin matrix 3b and a liquid crystal material 3a having cholesteric characteristics. The liquid crystal material 3a fills a space not occupied by the transparent resin matrix 3b. A pulse power source 4 is connected between transparent conductive films 2a and 2b. This liquid crystal element is not provided with a memory element such as a TFT or a MIM, and a simple matrix driving is performed.

In the liquid crystal element of the first embodiment, the liquid crystal material 3a is preferably chiral nematic liquid crystal material made of nematic liquid crystal material and chiral ingredient added thereto.

The transparent resin matrix 3b has a three-dimensional continuous mesh structure in this case. Alternatively, the transparent resin matrix 3b may have a droplet structure, a columnar structure or the like. The resin used in the transparent resin matrix 3b is photo-curing resin such as ultraviolet-curing resin. The composite layer is made of a mixture of polymerizable monomer or/and oligomer of photo-curing resin, which will be referred to as "resin material" hereinafter, and liquid crystal material, and a polymerization initiator added to the above mixture, and is prepared by phase-separating them by irradiation of light. Besides, the resin used in transparent resin matrix 3b may be a resin which can be cured by electron rays, heat or the like.

The liquid crystal material 3a and the resin used in the transparent resin matrix 3b may be selected to define a contact angle of 30° or less between them.

When chiral nematic liquid crystal material is used as the liquid crystal material having cholesteric characteristics, a weight ratio between the liquid crystal material and the resin material, which depends of the specific kinds of them, is preferably determined to satisfy such a relationship that a ratio between the liquid crystal material including the chiral ingredient and the resin monomer or the like is in a range from about 9:1 to about 7:3, because this range achieves a good contrast.

The liquid crystal element is of a transparent type.

In the liquid crystal element of the second embodiment, the liquid crystal material 3a is preferably chiral nematic liquid crystal material including tolane liquid crystal material having nematic characteristics, pyrimidine liquid crystal material having nematic characteristics, cyanobiphenyl liquid crystal material having nematic characteristics and chiral ingredient. The selective reflection wavelength of the liquid crystal material 3a is adjusted in a range from 1.0 μm to 1.5 μm. The transparent resin matrix 3b is the same as that of the liquid crystal element of the first embodiment.

In the liquid crystal element of the third embodiment, the liquid crystal material 3a is preferably chiral nematic liquid crystal material made of nematic liquid crystal material and chiral ingredient added thereto, and the nematic liquid crystal material contains tolane liquid crystal material having nematic characteristics and pyrimidine liquid crystal material having nematic characteristics, and additionally contains one or more of cyanobiphenyl liquid crystal material having nematic characteristics, PCH liquid crystal material having nematic characteristics and CCH liquid crystal material having nematic characteristics.

The transparent resin matrix 3b is prepared from a resin material which is made of a mixture of the compound expressed by the foregoing structural formula (1) and the multi-functional acrylate derivative (each of them is polymerizable monomer or/and oligomer), of which weight ratio is, in this case, in a range from 90:10 to 80:20.

The composite layer 3 is prepared in the following manner. After the resin material is mixed, the liquid crystal material 3a and the resin material of the transparent resin matrix 3b are mixed, in this case, at a weight ratio from 88:12 to 80:20, and the resin material is polymerized. The structure of the transparent resin matrix 3b is the same as that of the liquid crystal of the first embodiment of the invention.

Figure 1B:
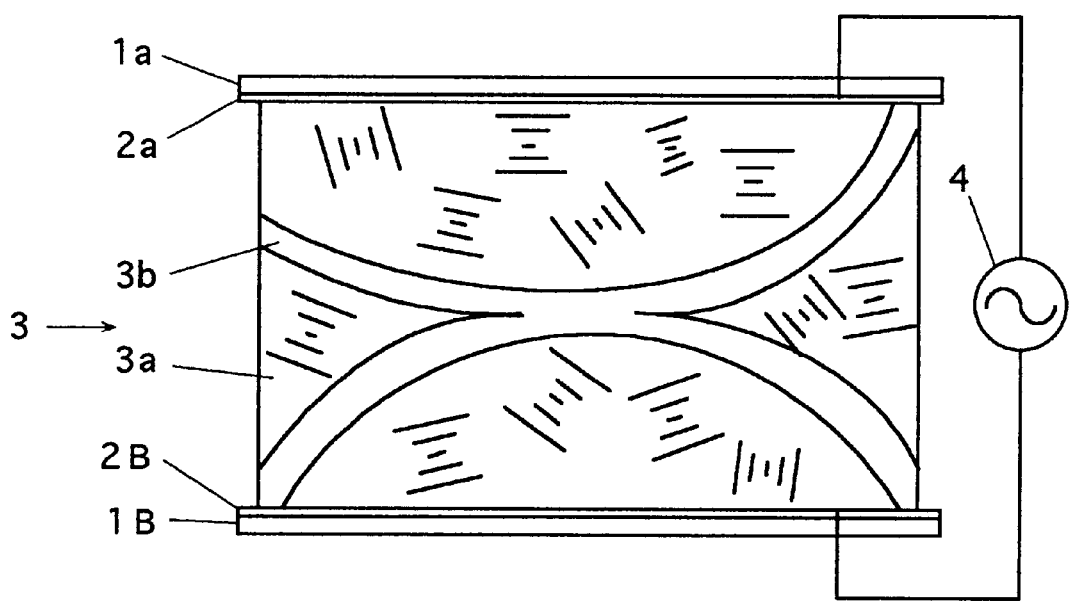
FIG. 1(B) shows another example of the first type liquid crystal element according to the invention.

FIG. 1(B) shows another preferred example of the liquid crystal element of the first embodiment. This liquid crystal element is of a reflective type, and differs from the liquid crystal element in FIG. 1(A) in that the transparent plate 1b and transparent conductive film 2b in FIG. 1(A) are replaced with an opaque plate 1B and an opaque conductive film 2B, respectively. Structures other than the above are the same as those in FIG. 1(A), and the same portions bear the same reference numbers.

Figure 2A:
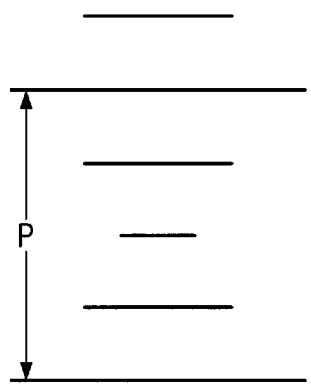
FIG. 2(A) and FIG. 2(B) show a helical pitch length of chiral nematic liquid crystal.
Figure 2A:
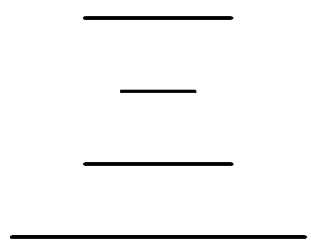
Figure 2B:
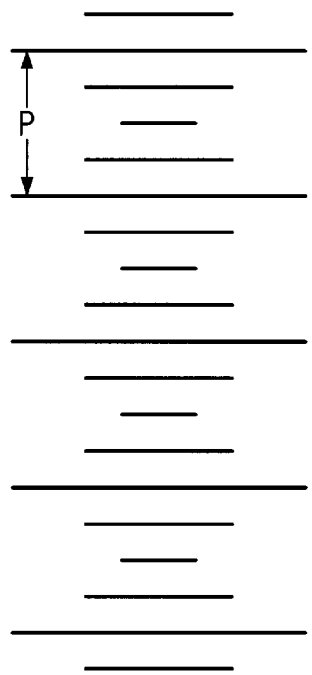

FIG. 2(A) and FIG. 2(B) show a spiral structure of liquid crystal molecules in the chiral nematic liquid crystal material. A distance P which is defined by 360° rotation of the liquid crystal molecule is referred to as a helical pitch length. If a rate of the mixed chiral ingredient is small, the liquid crystal molecule is not twisted to a large extent, so that it has a long helical pitch length P as shown in FIG. 2(A), resulting in a long selective reflection wavelength. Conversely, if a rate of the mixed chiral ingredient is large, the liquid crystal molecule has a short helical pitch length P as shown in FIG. 2(B), resulting in a short selective reflection wavelength.

Figure 3A:
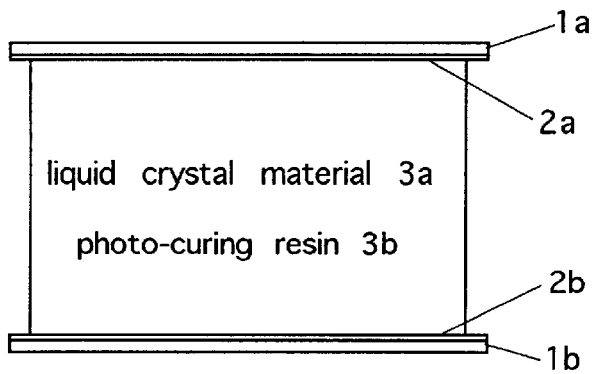
FIG. 3(A), FIG. 3(B) and FIG. 3(C) show an example of steps for manufacturing a liquid crystal element in FIG. 1(A)
Figure 3B:
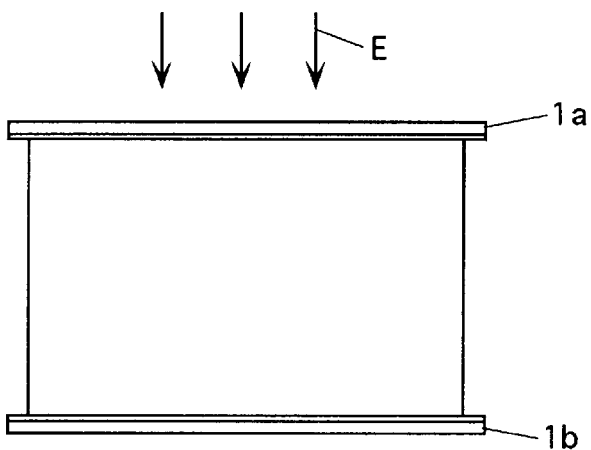
Figure 3C:
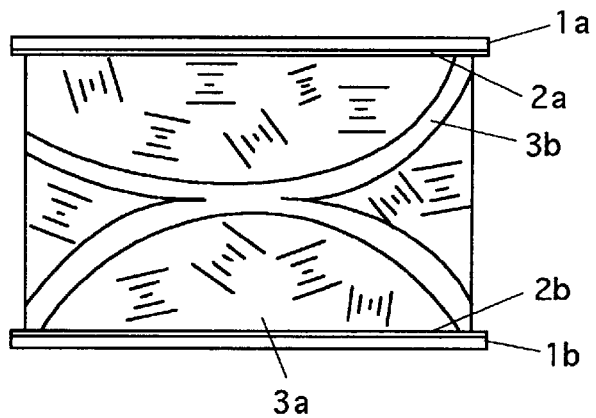

For manufacturing of the liquid crystal element in FIG. 1(A), the paired plates 1a and 1b coated with the conductive films 2a and 2b are assembled together with spacers (not shown) therebetween, and the conductive films 2a and 2b are opposed to each other as shown in FIG. 3(A). Then, the liquid crystal material, resin material and photo-polymerization initiator mixed at a predetermined mixing ratio are supplied into a space between the paired plates. As shown in FIG. 3(B), the resin material is cured by applying a polymerization energy E (e.g., light such as ultraviolet light) depending on the kind of the resin entirely to the mixture retained between the paired plates which are pressed toward each other. As a result, only the resin material is cured and thereby the phase separation occurs, so that the resin matrix 3b is formed as shown in FIG. 3(C).

In this state, the helical axes of liquid crystal material 3a having cholesteric characteristics are directed irregularly so that the focal-conic orientation is attained. If the selective reflection wavelength is outside the visible range, the liquid crystal material 3a scatters the visible rays to exhibit a white opaque appearance. If the selective reflection wavelength is in the visible range, it exhibits a transparent appearance. The selective reflection wavelength depends on the helical pitch length which was determined in advance. After that the pulse power source 4 is connected between the transparent conductive films 2a and 2b.

Figure 4A:
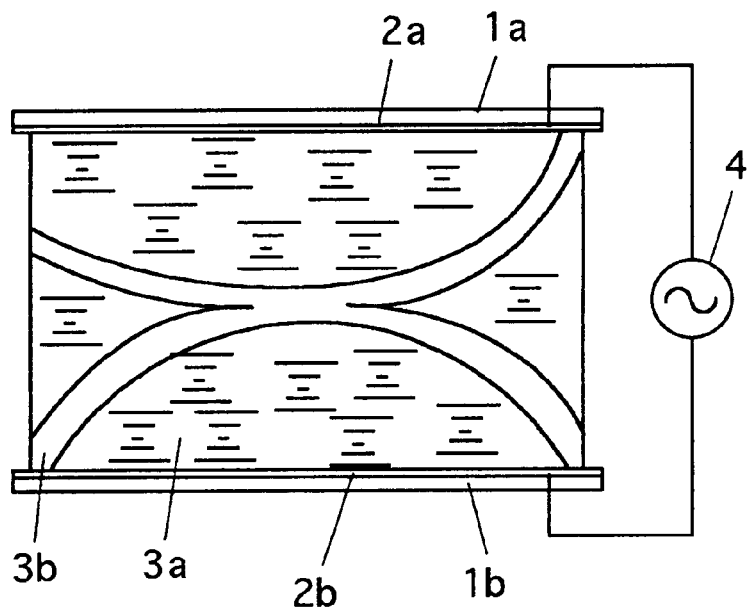
FIG. 4(A) and FIG. 4(B) show an example of change in voltage applied state of a composite layer of the liquid crystal element in FIG. 1(A), respectively.

For driving the liquid crystal element, two kinds of, i.e., high and low pulse voltages are applied. As shown in FIG. 4(A), the power source 4 applies a voltage of, e.g., about 160 V in the form of pulse of 10 msec to the composite layer 3 through the conductive films 2a and 2b. After the cease of voltage application, the helical axes of the liquid crystal material 3a which were initially directed irregularly are aligned in the direction perpendicular to the plates 1a and 1b, so that the liquid crystal material 3a exhibits a planar orientation. If the selective reflection wavelength is in the infrared range or ultraviolet range, the liquid crystal material transmits the visible light and therefore exhibits a transparent appearance. If the selective reflection wavelength is in the visible range, the liquid crystal material selectively reflects the light of the corresponding color, and therefore exhibits a colored state. The selective reflection wavelength depends on the helical pitch length which was determined in advance. According to the liquid crystal element of the second embodiment, the selective reflection wavelength is determined to be in a range from 1.0 $\mu$m to 1.5 $\mu$m, so that the liquid crystal material transmits the light in the visible range and therefore exhibits the transparent appearance.

Figure 4B:
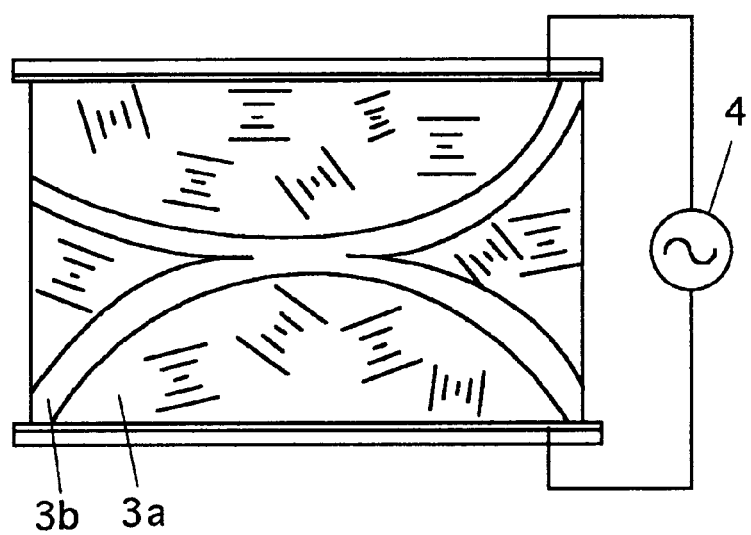

When this composite layer 3 is supplied, as shown in FIG. 4(B), with a voltage, e.g., of about 80V in the form of pulse of 10 msec from the power source 4, the state transition from the planar state or orientation to the focal-conic state or orientation is occurred. Each of these two orientations or states is stably held after the cease of application of the pulse voltage, and therefore the bistability is exhibited.

In the above description, the state of the composite layer 3 is uniformly changed by applying a voltage across the conductive films 2a and 2b, each of which is an integrated film and has the substantially same size as the plates 1a and 1b. Alternatively, the conductive films 2a and 2b may have matrix forms, and a predetermined voltage for achieving a planar orientation or a focal-conic orientation may be applied to the crossings or intersections in the matrix for writing image information such as characters or graphics in the composite layer 3.

The liquid crystal element in FIG. 1(B) can be manufactured and driven by manners similar to the above mentioned manners for the liquid crystal element shown in FIG. 1(A).

Figure 5A:
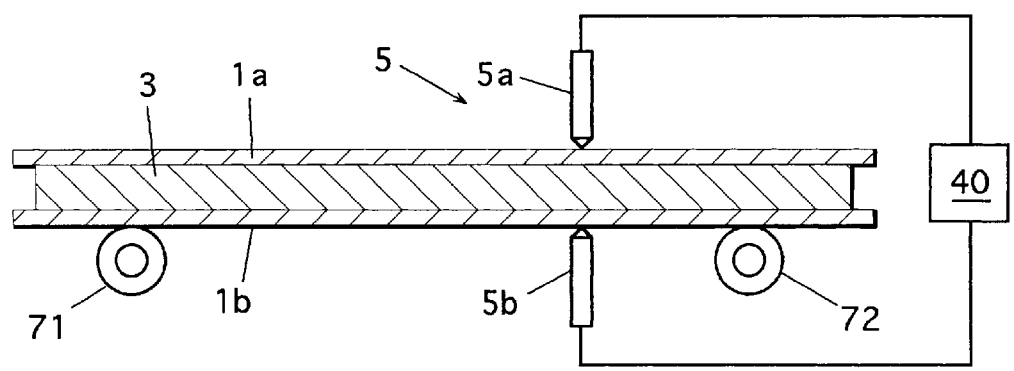
FIG. 5(A) is a cross section viewed from a side of still another example of the first type liquid crystal element (another example of the second and third type liquid crystal elements) according to the invention.
Figure 5B:
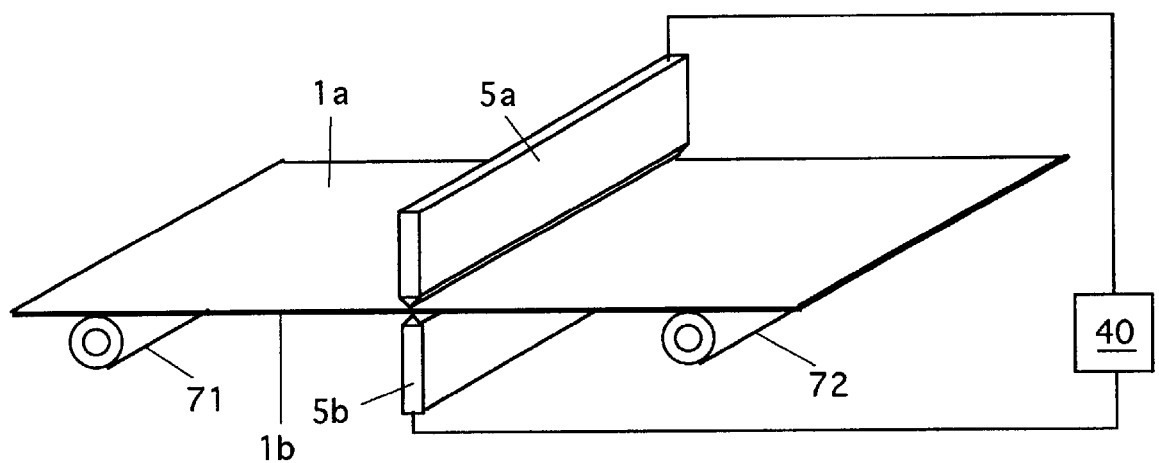
FIG. 5(B) is a perspective view of the liquid crystal element in FIG. 5(A)

FIG. 5(A) shows a cross section viewed from a side of still another example of the liquid crystal element of the first embodiment. FIG. 5(A) also shows a cross section viewed from a side of another example of the liquid crystal elements of the second or third embodiment. FIG. 5(B) is a perspective view of the liquid crystal element in FIG. 5(A). The liquid crystal element in FIG. 5(A) differs from the liquid crystal element in FIG. 1(A) in that the transparent conductive films 2a and 2b are not employed, and alternatively, an external electrode array 5 is employed. The electrode array 5 is formed of a pair of electrode supporting members 5a and 5b, in which a plurality of electrodes are arranged along the width direction of the plate. The electrode supporting members 5a and 5b have a width equal to or larger than widths of the plates 1a and 1b, respectively. The electrode supporting members 5a and 5b are spaced from each other by a slight distance, and the corresponding electrodes are opposed to each other. The plates 1a and 1b retaining the composite layer 3 therebetween can move relatively between the electrode supporting members 5a and 5b owing to rotation of transporting rollers 71 and 72. In the illustrated example, the rotating rollers 71 and 72 move the liquid crystal element. A write unit 40, which applies a pulse voltage to each electrode in accordance with an original image or the like, is connected between the electrode supporting members 5a and 5b. The structures other than the above are similar to those of the liquid crystal element in FIG. 1(A), and the same parts bear the same reference numbers.

For driving this liquid crystal element, the write unit 40 applies two kinds of (i.e., high and low) pulse voltages corresponding to the image information to the composite layer 3 through the electrodes of the electrode supporting members 5a and 5b (e.g., pulse voltages of 160 v and 10 msec and 80 v and 10 msec). Thereby, each portion in the layer can attain a planar orientation or a focal-conic orientation, similarly to the device in FIG. 1A–1B. In connection with this, the paired plates 1a and 1b retaining the composite layer 3 is moved between the electrode supporting members 5a and 5b of the external electrode array 5. Alternatively, the plates 1a and 1b can be kept stationary, and the external electrode array 5 moved. In either manner, a voltage can be applied to the composite layer 3 retained between the plates 1a and 1b through its entire length, so that the composite layer 3 may entirely attain an uniform state. In another method, the paired plates 1a and 1b retaining the composite layer 3 is moved between the electrode supporting members 5a and 5b of the external electrode array 5, or the external electrode array 5 is moved with the plates 1a and 1b held stationary. In either manner, a predetermined voltage signal corresponding to image information can be applied for writing image information such as characters or images in the composite layer 3.

This liquid crystal element can be used as a rewritable OHP sheet. An absorbing layer determining a background color such as a black may be arranged outside one of the plates, so that the liquid crystal element can be used as rewritable monochrome paper. Further, a pen supplied with a voltage may be employed for allowing additional writing by bringing the pen into contact with the plate.

Figure 6:
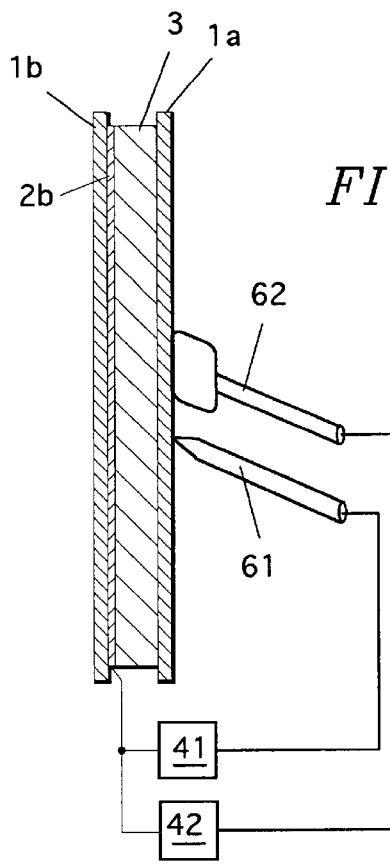
FIG. 6 shows yet another example of the first, second and third type liquid crystal elements according to the invention.

FIG. 6 shows still another example of the liquid crystal elements of the first, second and third embodiments. This liquid crystal element is used as an electronic white board. The liquid crystal element does not employ the transparent conductive film 2a which is arranged on the plate 1a in the liquid crystal element and particularly at a side opposed to a user in FIG. 1(A), and alternatively uses a pen electrode 61 and an erasing electrode 62 for the plate 1a. The plate 1b at the rear side is black, and is coated with the transparent conductive film (electrode layer) 2b. The pen electrode 61 is employed for writing image information such as characters and images, and has a thin tip end for easy writing of characters or the like. A pulse power source 41 is connected between the pen electrode 61 and the transparent conductive film 2b. The pulse power source 41 supplies a pulse voltage, e.g., of 160 V and 10 msec.

The erasing electrode 62 is used as an eraser for erasing the image information written in the composite layer 3 by the pen electrode 61, and has a thick tip end for increasing a comparatively large area. A pulse power source 42 is connected between the erasing electrode 62 and the transparent conductive film 2b. The pulse power source 42 generates a pulse voltage, e.g., of 80 V and 10 msec. The tip end of the erasing electrode 62 may be formed of an electrode array.

For using this liquid crystal element (electronic white board), the selective reflection wavelength of the liquid crystal material in the composite layer 3 is set to a value, e.g., in an infrared range, whereby the liquid crystal material in the composite layer 3 initially exhibits a white opaque appearance owing to the focal-conic orientation. When the pen electrode 61 is moved in contact with the plate 1a, the liquid crystal material in the composite layer 3 corresponding to the contact portions exhibits the planar orientation, so that it displays a black area. For erasing the black areas, the erasing electrode 62 is moved in contact with the black portion on the plate 1a. Thereby, the liquid crystal material in the composite layer 3 corresponding to the contact portion returns to the focal-conic orientation, and therefore exhibits a white appearance. For safety of a user, the pen electrode 61 and the erasing electrode 62 may be provided with switches for applying the voltage to the electrodes 41 and 42 only when the switches are on, respectively.

Specific examples of the invention will now be described below.

In the following examples, the liquid crystal element of the type shown in FIG. 1(A) was prepared. The transmittance was obtained by measuring a spectral reflectance (Y-value) with a spectrocolorimeter CM-1000 (manufactured by Minolta Co., Ltd., reflection type) having a white light source. The smaller Y-value represents higher transparency. The contrast is determined by (Y-value in the scattering state)/(Y-value in the transparent state). Nematic liquid crystal (MN1000XX) manufactured by Chisso Co., Ltd., in the following description contains tolane compound as a major component, and also contains aromatic rings, fluorine atoms or the like. It has the following properties.

$\Delta n: 0.219$ ($\lambda=589$ nm), $T_{N-1}=69.9°$ C., $V_{90}=2.29$ V, $\eta_{20}=30.6$ cps The contact angle was measured with a contact angle meter CA-A (Kyowa Kaimen Kagaku Co., Ltd.).

Specific examples of the liquid crystal element of the first embodiment will be described below.

EXAMPLE 1-1

A chiral ingredient S-811 (Merck Co., Ltd.) was mixed at a rate, e.g., of 18% by weight with a material formed of tolane liquid crystal MN1000XX (Chisso Co., Ltd.) and nematic liquid crystal E44 (Merck Co., Ltd.) added thereto at 20% by weight, so that a predetermined selective reflection wavelength (e.g., of 1.1 μm) was attained. The mixture thus prepared was mixed at a rate of 86:14 with photo-curing resin material for holding the mixture (The mixture: photo-curing resin=86:14). The photo-curing resin material was prepared by adding bifunctional acrylate monomer HDDA (Nippon Kayaku Co., Ltd.) at 10% by weight to o-phenylphenyl oxyethyl acrylate monomer, and further adding thereto photo-polymerization initiator DAROCUR 1173 (Ciba-Geigy Co., Ltd.) at 10% by weight.

The material thus prepared and having a thickness of about 20 μm was retained between the transparent plate having an electrode layer and the opaque plate having an electrode layer, and ultraviolet rays were irradiated thereto at 15 mw/cm² for 10 minutes. As a result of the irradiation, phase-separation occurred, and an opaque liquid crystal element was prepared. A pulse voltage (10 msec) of 150 V was applied to this liquid crystal element, so that the liquid crystal element became transparent, and exhibited a Y-value of 4.01. This state was held thereafter. Further, a pulse voltage (10 msec) of 80 V was applied to the liquid crystal element in this state, so that it exhibited the Y-value of 12.96 and became opaque. This state was kept thereafter. The contrast was 3.23.

The contact angle between the liquid crystal having cholesteric characteristics and the resin was 19.6°.

Figure 10:
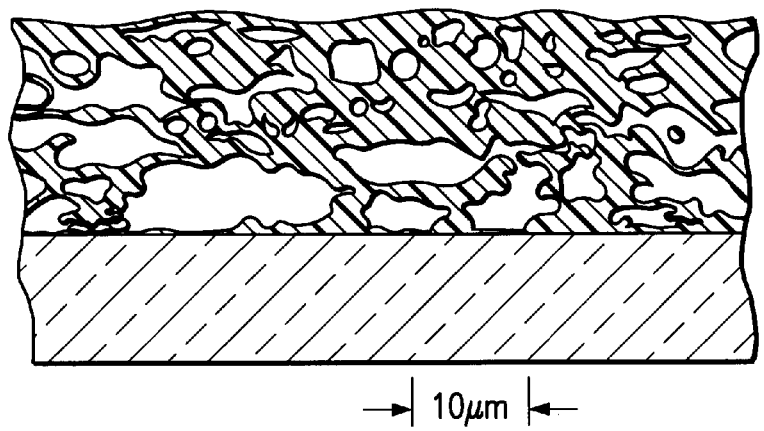
FIG. 10 shows a cross section, corresponding to a transmission electron microscope image, of a resin matrix of a composite layer in a example of the liquid crystal of the first type according to the invention.

For reference, a view is provided in FIG. 10, which was taken by a transmission electron microscope of magnification of 2000, of a cross section of a composite layer of the liquid crystal according to this embodiment. This view was obtained by removing one of the plates of the liquid crystal element and washing away the liquid crystal in the composite layer. It can be seen therefrom that the phase-separated resin has a mesh structure.

EXAMPLE 1-2

A chiral ingredient S-811 (Merck Co., Ltd.) was mixed, e.g., at a rate of 18% by weight with a material formed of tolane liquid crystal MN1000XX (Chisso Co., Ltd.) and nematic liquid crystal E44 (Merck Co., Ltd.) added thereto at 20% by weight, so that a predetermined selective reflection wavelength (e.g., of 1.1 μm) was attained. The mixture thus prepared was mixed at a rate of 86:14 with photo-curing resin material for holding the mixture. The photo-curing resin material was prepared by adding photo-polymerization initiator DAROCUR 1173 (Ciba-Geigy Co., Ltd.) at 10% by weight to R128H (Nippon Kayaku Co., Ltd.).

The material thus prepared and having a thickness of about 20 μm was retained between the transparent plate having an electrode layer and the opaque plate having an electrode layer, and ultraviolet rays were irradiated thereto at 15 mw/cm² for 10 minutes. Thereby, phase-separation occurred, and an opaque liquid crystal element was prepared. A pulse voltage (10 msec) of 150 V was applied to this liquid crystal element, so that the liquid crystal element became transparent, and exhibited a Y-value of 6.44. This state was held thereafter. Further, a pulse voltage (10 msec) of 80 V was applied to the liquid crystal element in this state, so that it exhibited the Y-value of 14.87 and became opaque. This state was kept thereafter. The contrast was 2.31.

The contact angle between the liquid crystal having cholesteric characteristics and the resin was 24.8°.

EXAMPLE 1-3

A chiral ingredient S-811 (Merck Co., Ltd.) was mixed, e.g., at a rate of 18% by weight with a material formed of tolane liquid crystal MN1000XX (Chisso Co., Ltd.) and nematic liquid crystal E44 (Merck Co., Ltd.) added thereto at 20% by weight, so that a predetermined selective reflection wavelength (e.g., of 1.1 μm) was attained. The mixture thus prepared was mixed at a rate of 86:14 with photo-curing resin material for holding the mixture. The photo-curing resin material was prepared by adding TPA320 (Nippon Kayaku Co., Ltd.) at 10% by weight to o-phenylphenyl oxyethyl acrylate monomer, and further adding thereto photo-polymerization initiator DAROCUR 1173 (Ciba-Geigy Co., Ltd.) at 10% by weight.

The material thus prepared and having a thickness of about 20 μm was retained between the transparent plate having an electrode layer and the opaque plate having an electrode layer, and ultraviolet rays were irradiated thereto at 15 mw/cm² for 10 minutes. As a result of the irradiation, phase-separation occurred, and an opaque liquid crystal element was prepared. A pulse voltage (10 msec) of 150 V was applied to this liquid crystal element, so that the liquid crystal element became transparent, and exhibited a Y-value of 3.64. This state was kept thereafter. Further, a pulse voltage (10 msec) of 80 V was applied to the liquid crystal element in this state, so that it exhibited the Y-value of 11.09 and became opaque. This state was kept thereafter. The contrast was 3.01.

The contact angle between the liquid crystal having cholesteric characteristics and the resin was 20.6°.

EXAMPLE 1-4

A chiral ingredient S-811 (Merck Co., Ltd.) was mixed, e.g., at a rate of 18% by weight with a material formed of tolane liquid crystal MN1000XX (Chisso Co., Ltd.) and nematic liquid crystal M33 (Merck Co., Ltd.) added thereto at 15% by weight, so that a predetermined selective reflection wavelength (e.g., of 1.1 μm) was attained. The mixture thus prepared was mixed at a rate of 86:14 with photo-curing resin material for holding the mixture. The photo-curing resin material was prepared by adding bifunctional acrylate monomer HDDA (Nippon Kayaku Co., Ltd.) at 10% by weight to o-phenylphenyl oxyethyl acrylate monomer, and further adding thereto photo-polymerization initiator DAROCUR 1173 (Ciba-Geigy Co., Ltd.) at 10% by weight.

The material thus prepared and having a thickness of about 20 μm was retained between the transparent plate having an electrode layer and the opaque plate having an electrode layer, and ultraviolet rays were irradiated thereto at 15 mw/cm$^2$ for 10 minutes. As a result of the irradiation, phase-separation occurred, and an opaque liquid crystal element was prepared. A pulse voltage (10 msec) of 150 V was applied to this liquid crystal element, so that the liquid crystal element became transparent, and exhibited a Y-value of 3.11. This state was held thereafter. Further, a pulse voltage (10 msec) of 80 V was applied to the liquid crystal element in this state, so that it exhibited the Y-value of 11.36 and became opaque. This state was kept thereafter. The contrast was 3.65.

The contact angle between the liquid crystal having cholesteric characteristics and the resin was 25.9°.

Comparative Example 1-1

A chiral ingredient S-811 (Merck Co., Ltd.) was mixed, e.g., at a rate of 18% by weight with a material formed of tolane liquid crystal MN1000XX (Chisso Co., Ltd.) and nematic liquid crystal E44 (Merck Co., Ltd.) added thereto at 20% by weight, so that a predetermined selective reflection wavelength (e.g., of 1.1 μm) was attained. The mixture thus prepared was mixed at a rate of 86:14 with photo-curing resin material for holding the mixture. The photo-curing resin material was prepared by adding trifunctional acrylate monomer THE330 (Nippon Kayaku Co., Ltd.) at 10% by weight to tetrahydrofurfuryl acrylate monomer, and further adding thereto photo-polymerization initiator DAROCUR 1173 (Ciba-Geigy Co., Ltd.) at 10% by weight.

The material thus prepared and having a thickness of about 20 μm was retained between the transparent plate having an electrode layer and the opaque plate having an electrode layer, and ultraviolet rays were irradiated thereto at 15 mw/cm$^2$ for 10 minutes. As a result of the irradiation, phase-separation occurred, and an opaque liquid crystal element was prepared. A pulse voltage (10 msec) of 150 V was applied to this liquid crystal element, so that the liquid crystal element became transparent, and exhibited a Y-value of 8.85. This state was held thereafter. Further, a pulse voltage (10 msec) of 80 V was applied to the liquid crystal element in this state, so that it exhibited the Y-value of 14.57 and became opaque. This state was kept thereafter. The contrast was 1.65.

The contact angle between the liquid crystal having cholesteric characteristics and the resin was 41.4°.

Comparative Example 1-2

A chiral ingredient S-811 (Merck Co., Ltd.) was mixed, e.g., at a rate of 18% by weight with a material formed of tolane liquid crystal MN1000XX (Chisso Co., Ltd.) and nematic liquid crystal E44 (Merck Co., Ltd.) added thereto at 20% by weight, so that a predetermined selective reflection wavelength (e.g., of 1.1 μm) was attained. The mixture thus prepared was mixed at a rate of 86:14 with photo-curing resin material for holding the mixture. The photo-curing resin material was prepared by adding bifunctional acrylate monomer HDDA (Nippon Kayaku Co., Ltd.) at 10% by weight to tetrahydrofurfuryl acrylate monomer, and further adding thereto photo-polymerization initiator DAROCUR 1173 (Ciba-Geigy Co., Ltd.) at 10% by weight.

The material thus prepared and having a thickness of about 20 μm was retained between the transparent plate having an electrode layer and the opaque plate having an electrode layer, and ultraviolet rays were irradiated thereto at 15 mw/cm$^2$ for 10 minutes. As a result of the irradiation, phase-separation occurred, and an opaque liquid crystal element was prepared. A pulse voltage (10 msec) of 150 V was applied to this liquid crystal element, so that the liquid crystal element became transparent, and exhibited a Y-value of 10.38. This state was kept thereafter. Further, a pulse voltage (10 msec) of 80 V was applied to the liquid crystal element in this state, so that it exhibited the Y-value of 14.18 and became opaque. This state was kept thereafter. The contrast was 1.37.

The contact angle between the liquid crystal having cholesteric characteristics and the resin was 33.8°.

Comparative Example 1-3

A chiral ingredient-S-811 (Merck Co., Ltd.) was mixed, e.g., at a rate of 18% by weight with a material formed of tolane liquid crystal MN1000XX (Chisso Co., Ltd.) and nematic liquid crystal M33 (Merck Co., Ltd.) added thereto at 15% by weight, so that a predetermined selective reflection wavelength (e.g., of 1.1 μm) was attained. The mixture thus prepared was mixed at a rate of 86:14 with photo-curing resin material for holding the mixture. The photo-curing resin material was prepared by adding photo-polymerization initiator DAROCUR 1173 (Ciba-Geigy Co., Ltd.) at 10% by weight to R128H (Nippon Kayaku CO., Ltd.).

The material thus prepared and having a thickness of about 20 μm was retained between the transparent plate having an electrode layer and the opaque plate having an electrode layer, and ultraviolet rays were irradiated thereto at 15 mw/cm$^2$ for 10 minutes. As a result of the irradiation, phase-separation occurred, and an opaque liquid crystal element was prepared. A pulse voltage (10 msec) of 150 V was applied to this liquid crystal element, so that the liquid crystal element became transparent, and exhibited a Y-value of 7.78. This state was kept thereafter. Further, a pulse voltage (10 msec) of 80 V was applied to the liquid crystal element in this state, so that it exhibited the Y-value of 17.1 and became opaque. This state was kept thereafter. The contrast was 2.20.

The contact angle between the liquid crystal having cholesteric characteristics and the resin was 36.4°.

Comparative Example 1-4

A chiral ingredient S-811 (Merck Co., Ltd.) was mixed, e.g., at a rate of 18% by weight with a material formed of tolane liquid crystal MN1000XX (Chisso Co., Ltd.) and nematic liquid crystal M33 (Merck Co., Ltd.) added thereto at 15% by weight, so that a predetermined selective reflection wavelength (e.g., of 1.1 μm) was attained. The mixture thus prepared was mixed at a rate of 86:14 with photo-curing resin material for holding the mixture. The photo-curing resin material was prepared by adding bifunctional acrylate monomer HDDA (Nippon Kayaku Co., Ltd.) at 10% by weight to tetrahydrofurfuryl acrylate monomer, and further adding thereto photo-polymerization initiator DAROCUR 1173 (Ciba-Geigy Co., Ltd.) at 10% by weight.

The material thus prepared and having a thickness of about 20 μm was retained between the transparent plate having an electrode layer and the opaque plate having an electrode layer, and ultraviolet rays were irradiated thereto at 15 mw/cm$^2$ for 10 minutes. As a result of the irradiation, phase-separation occurred, and an opaque liquid crystal element was prepared. A pulse voltage (10 msec) of 150 V was applied to this liquid crystal element, so that the liquid crystal element became transparent, and exhibited a Y-value of 8.71. This state was kept thereafter. Further, a pulse voltage (10 msec) of 80 V was applied to the liquid crystal element in this state, so that it exhibited the Y-value of 15.98 and became opaque. This state was kept thereafter. The contrast was 1.83.

The contact angle between the liquid crystal having cholesteric characteristics and the resin was 39.8°.

In connection with the liquid crystal elements of the examples 1-1 to 1-4 and the comparative examples 1-1 to 1-4 4, the following Table 1 represents the structures of the composite layers, Y-values in the transparent state, Y-values in the scattering state, contrasts and contact angles between the liquid crystal and the resin.

TABLE 1

| | LC | Resin | Y (t) | Y (s) | CT | CA |
|---|---|---|---|---|---|---|
| E 1-1 | MN/E44/S | o-p + HDDA | 4.01 | 12.96 | 3.23 | 19.6 |
| E 1-3 | MN/E44/S | o-p + TPA320 | 3.64 | 11.09 | 3.01 | 20.6 |
| E 1-2 | MN/E44/S | R128H | 6.44 | 14.87 | 2.31 | 24.8 |
| CE 1-2 | MN/E44/S | t/a + HDDA | 10.38 | 14.18 | 1.37 | 33.8 |
| CE 1-1 | MN/E44/S | t/a + THE330 | 8.85 | 14.57 | 1.65 | 41.4 |
| E 1-4 | MN/M33/S | o-p + HDDA | 3.11 | 11.36 | 3.65 | 25.9 |
| CE 1-3 | MN/M33/S | R128H | 7.78 | 17.1 | 2.20 | 36.4 |
| CE 1-4 | MN/M33/S | t/a + HDDA | 8.71 | 15.98 | 1.83 | 39.8 |

Figure 7:
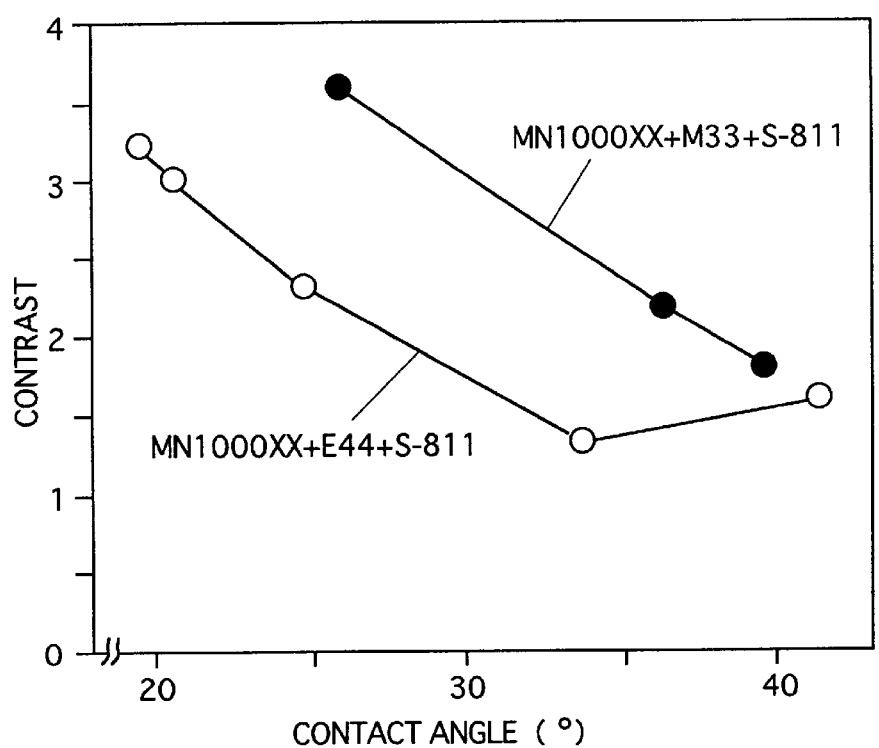
FIG. 7 shows an example of a relationship between a contact angle, which is defined between liquid crystal and resin, and a contrast in the first type liquid crystal element according to the invention.

LC: liquid crystal material
Resin: resin material
Y (t): Y-value in transparent state
Y (s): Y-value in scattering state
CT: contrast
CA: contact angle (°)
E: example
CE: comparative example
MN/E44/S: MN1000XX + E44 + S-811
MN/M33/S: MN1000XX + M33 + S-811
o-p: o-phenylphenyl oxyethyl acrylate monomer
t/a: tetrahydrofurfuryl acrylate monomer In connection with the examples 1-1 to 1-4 and the comparative examples 1-1 to 1-4, FIG. 7 is a graph prepared by plotting the contrast with respect to the contact angle between the liquid crystal and the resin, and FIG. 8 is a graph prepared by plotting the Y-value in the transparent state with respect to the contact angle.

From the table 1 and FIG. 7, it can be understood as follows: As the contact angle between the liquid crystal and the resin is reduced by selectively employing various kinds of resin and the same kind of liquid crystal, the contrast increases. Conversely, the contrast decreases with increase in contact angle. In all the examples 1-1 to 1-4, in which the contact angle is 30° or less, the contrast is 1.8 or more, which is superior to that of the comparative examples in which the same liquid crystal material was used but the contact angle exceeded 30°.

Figure 8:
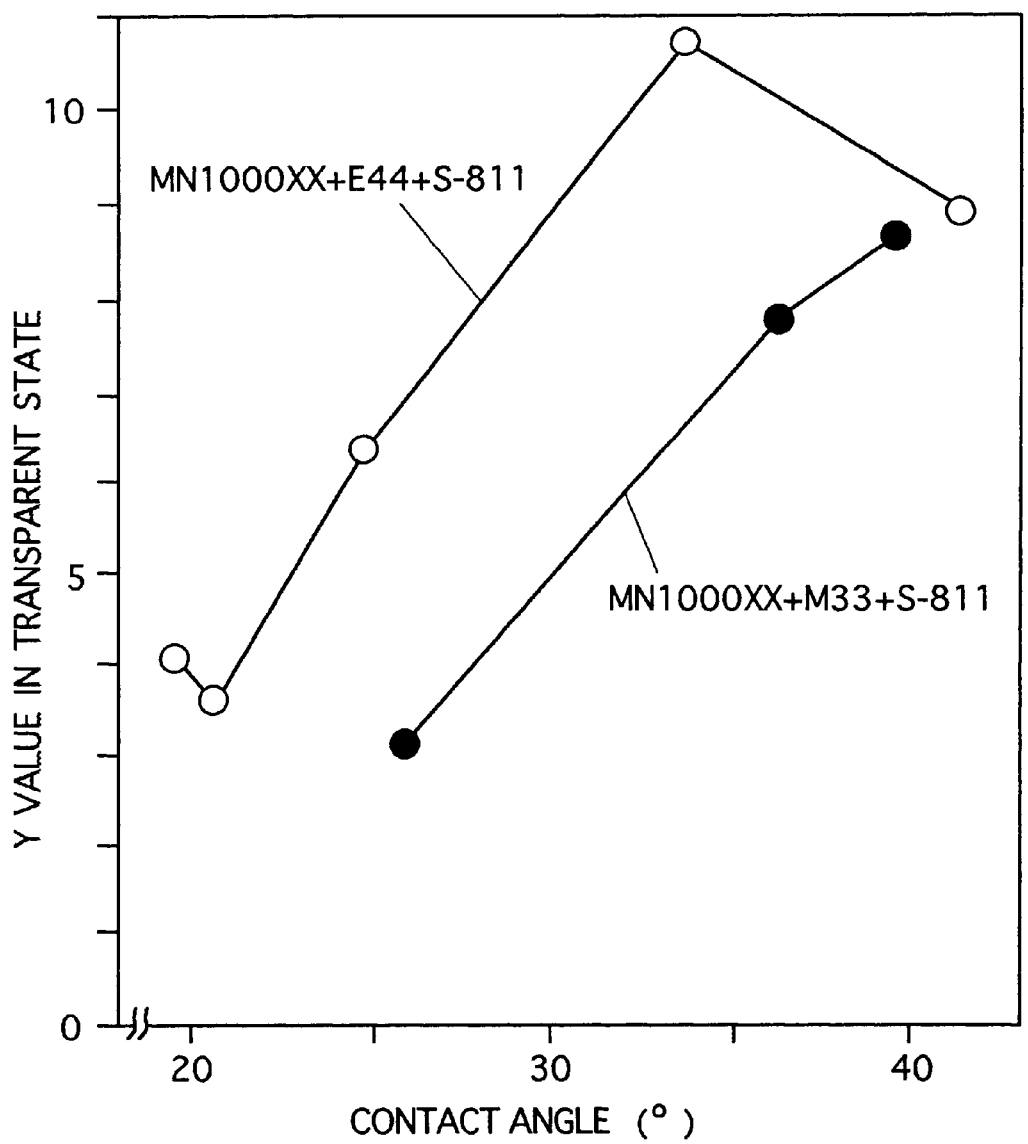
FIG. 8 shows an example of a relationship between a contact angle and a Y-value in the transparent state of the first type liquid crystal element according to the invention.

For the table 1 and FIG. 8, the following can be understood. With a change in contact angle between the liquid crystal and the resin, the Y-value in the scattering state does not change to a large extent, but the Y-value in the transparent state changes to a large extent. If the same kind of liquid crystal is employed, the Y-value in the transparent state decreases and therefore produces a larger difference with respect to the Y-value in the scattering state, as the contact angle is reduced by changing the kind of the resin. Conversely, the Y-value in the transparent state increases and therefore approaches to the Y-value in the scattering state with increase in contact angle.

In the examples 1-1 to 1-4 in which the contact angle is 30° or less, the transmittance in the transparent state is good (Y-value of 7.0 or less) as described above, so that it can be considered that these examples achieve good contrast (1.8 or more).

Examples of the second embodiment of the liquid crystal element will be described below.

EXAMPLE 2-1

A chiral ingredient S-811 (Merck Co., Ltd.) was mixed at a rate of 17.8% by weight with a material formed of tolane liquid crystal MN1000XX (Chisso Co., Ltd.) and cyanobiphenyl liquid crystal E44 (Merck Co., Ltd.) having nematic characteristics and added thereto at a ratio of 80:20 (MN1000XX: E44=80:20), so that a liquid crystal mixture having a selective reflection wavelength of 1.1 μm was prepared. The liquid crystal MN1000XX contains tolane liquid crystal having nematic characteristics and pyrimidine liquid crystal having nematic characteristics. The liquid crystal thus prepared and having cholesteric characteristics was mixed at a rate of 84:16 with photo-curing resin material for holding the liquid crystal (liquid crystal: resin material= 84:16). The photo-curing resin material was prepared by adding bifunctional acrylate monomer HDDA (Nippon Kayaku Co., Ltd.) at a rate of 90:10 to o-phenylphenyl oxyethyl acrylate monomer (o-phenylphenyl oxyethyl acrylate monomer: HDDA=90:10), and further adding thereto photo-polymerization initiator DAROCUR 1173 (Ciba-Geigy Co., Ltd.) at 10% by weight.

The material thus prepared was applied to a transparent glass plate coated with a transparent electrode layer, and another transparent glass plate having another transparent electrode layer was laid over them with resin spacers of 20 μm in thickness therebetween. Ultraviolet rays were irradiated thereto at 13 mw/cu$^2$ for 5 minutes. As a result of the irradiation, phase-separation occurred, and an opaque liquid crystal element was prepared. During polymerization, the mixture of the liquid crystal and the resin material was kept at a temperature not exceeding 30° by air-cooling.

A black absorber layer is arranged on a plate at the side opposite to the light incident side.

A pulse voltage (10 msec) of 160 V was applied to this liquid crystal element, so that the liquid crystal element attained a planar orientation and therefore a transparent state exhibiting a black appearance owing to the background color. In this state, the Y-value was 4.38, and this state was kept thereafter. Further, a pulse voltage (10 msec) of 80 V was applied to the liquid crystal element in this state, so that it attained a focal-conic orientation and therefore a scattering opaque state, and exhibited the Y-value of 13.15. This state was kept thereafter. The contrast was 3.00.

EXAMPLE 2-2

A chiral ingredient S-811 (Merck Co., Ltd.) was mixed at a rate of 21.0% by weight with a material formed of tolane liquid crystal MN1000XX (Chisso Co., Ltd.) and cyanobiphenyl liquid crystal E44 (Merck Co., Ltd.) having nematic characteristics and added thereto at a ratio of 80:20, so that a liquid crystal mixture having a selective reflection wavelength of 1.0 μm was prepared. The liquid crystal thus prepared was mixed with a resin material similarly to the example 2-1. The phase-separation was performed in the above mixture retained between a pair of plates. As a result of the irradiation, an opaque liquid crystal element was prepared. A pulse voltage (10 msec) of 160 V was applied to this liquid crystal element, so that the liquid crystal element attained a transparent state exhibiting a black appearance owing to the background color. In this state, the Y-value was 5.60, and this state was kept thereafter. Further, a pulse voltage (10 msec) of 80 V was applied to the liquid crystal element in this state, so that it attained a scattering opaque state, and exhibited the Y-value of 11.35. This state was kept thereafter. The contrast was 2.02.

EXAMPLE 2-3

A chiral ingredient S-811 (Merck Co., Ltd.) was mixed at a rate of 15.6% by weight with a material formed of tolane liquid crystal MN1000XX (Chisso Co., Ltd.) and cyanobiphenyl liquid crystal E44 (Merck Co., Ltd.) having nematic characteristics and added thereto at a ratio of 80:20, so that a liquid crystal mixture having a selective reflection wavelength of 1.3 μm was prepared. The liquid crystal thus prepared was mixed with a resin material similarly to the example 2-1. The phase-separation was performed in the above mixture retained between a pair of plates. As a result of the irradiation, an opaque liquid crystal element was prepared. A pulse voltage (10 msec) of 160 V was applied to this liquid crystal element, so that the liquid crystal element attained a transparent state exhibiting a black appearance owing to the background color. In this state, the Y-value was 5.80, and this state was kept thereafter. Further, a pulse voltage (10 msec) of 80 V was applied to the liquid crystal element in this state, so that it attained a scattering opaque state, and exhibited the Y-value of 15.1. This state was kept thereafter. The contrast was 2.61.

EXAMPLE 2-4

A chiral ingredient S-811 (Merck Co., Ltd.) was mixed at a rate of 13.5% by weight with a material formed of tolane liquid crystal MN1000XX (Chisso Co., Ltd.) and cyanobiphenyl liquid crystal E44 (Merck Co., Ltd.) having nematic characteristics and added thereto at a ratio of 80:20, so that a liquid crystal mixture having a selective reflection wavelength of 1.5 μm was prepared. The liquid crystal thus prepared was mixed with a resin material similarly to the example 2-1. The phase-separation was performed in the above mixture retained between a pair of plates. As a result of the irradiation, an opaque liquid crystal element was prepared. A pulse voltage (10 msec) of 160 V was applied to this liquid crystal element, so that the liquid crystal element attained a transparent state exhibiting a black appearance owing to the background color. In this state, the Y-value was 5.34, and this state was kept thereafter. Further, a pulse voltage (10 msec) of 80 V was applied to the liquid crystal element in this state, so that it attained a scattering opaque state, and exhibited the Y-value of 12.74. This state was kept thereafter. The contrast was 2.39.

Comparative Example 2-1

A chiral ingredient S-811 (Merck Co., Ltd.) was mixed at a rate of 10.1% by weight with a material formed of tolane liquid crystal MN1000XX (Chisso Co., Ltd.) and cyanobiphenyl liquid crystal E44 (Merck Co., Ltd.) having nematic characteristics and added thereto at a ratio of 80:20, so that a liquid crystal mixture having a selective reflection wavelength of 2.0 μm was prepared. The liquid crystal thus prepared was mixed with a resin material similarly to the example 2-1. The phase-separation was performed in the above mixture retained between a pair of plates. As a result of the phase separation, an opaque liquid crystal element was prepared. A pulse voltage (10 msec) of 120 V was applied to this liquid crystal element, so that the liquid crystal element attained a transparent state exhibiting a black appearance owing to the background color. In this state, the Y-value was 5.75, and this state was kept thereafter. Further, a pulse voltage (10 msec) of 50 V was applied to the liquid crystal element in this state, so that it attained a scattering opaque state, and exhibited the Y-value of 10.30. This state was kept thereafter. The contrast was 1.79.

Comparative Example 2-2

A chiral ingredient S-811 (Merck Co., Ltd.) was mixed at a rate of 24.9% by weight with a material formed of tolane liquid crystal MN1000XX (Chisso Co., Ltd.) and cyanobiphenyl liquid crystal E44 (Merck Co., Ltd.) having nematic characteristics and added thereto at a ratio of 80:20, so that a liquid crystal mixture having a selective reflection wavelength of 0.87 μm was prepared. The liquid crystal thus prepared was mixed with a resin material similarly to the example 2-1. The phase-separation was performed in the above mixture retained between a pair of plates. As a result of the phase separation, an opaque liquid crystal element was prepared. A pulse voltage (10 msec) of 160 V was applied to this liquid crystal element, so that the liquid crystal element attained a transparent state exhibiting a black appearance owing to the background color. In this state, the Y-value was 7.88, and this state was kept thereafter. Further, a pulse voltage (10 msec) of 80 V was applied to the liquid crystal element in this state, so that it attained a scattering opaque state, and exhibited the Y-value of 10.44. This state was kept thereafter. The contrast was 1.33.

In connection with the liquid crystal elements of the examples 2-1 to 2-4 and the comparative examples 2-1 and 2-2, the following Table 2 represents the mixing rates of the chiral ingredient with respect to the liquid crystal material, the selective reflection wavelengths of the prepared liquid crystal, Y-values in the transparent state, Y-values in the scattering state and contrasts.

TABLE 2

|       | C-%  | W/L  | Y (t) | Y (s) | Contrast |
|-------|------|------|-------|-------|----------|
| E 2-1 | 17.8 | 1.1  | 4.38  | 13.15 | 3.00     |
| E 2-2 | 21.0 | 1.0  | 5.6   | 11.35 | 2.02     |
| E 2-3 | 15.6 | 1.3  | 5.8   | 15.1  | 2.61     |
| E 2-4 | 13.5 | 1.5  | 5.34  | 12.74 | 2.39     |
| CE 2-1| 10.1 | 2.0  | 5.75  | 10.3  | 1.79     |
| CE 2-2| 24.9 | 0.87 | 7.88  | 10.44 | 1.33     |

C-%: addition rate of chiral ingridient (% by weight)
W/L: selective reflection wavelength (μm)
Y (t): Y-value in transparent state
Y (s): Y-value in scattering state
E: example
CE: comparative example In connection with the examples 2-1 to 2-4 and the comparative examples 2-1 and 2-2, FIG. 9 is a graph prepared by plotting the contrast with respect to the selective reflection wavelength of the liquid crystal.

Figure 9:
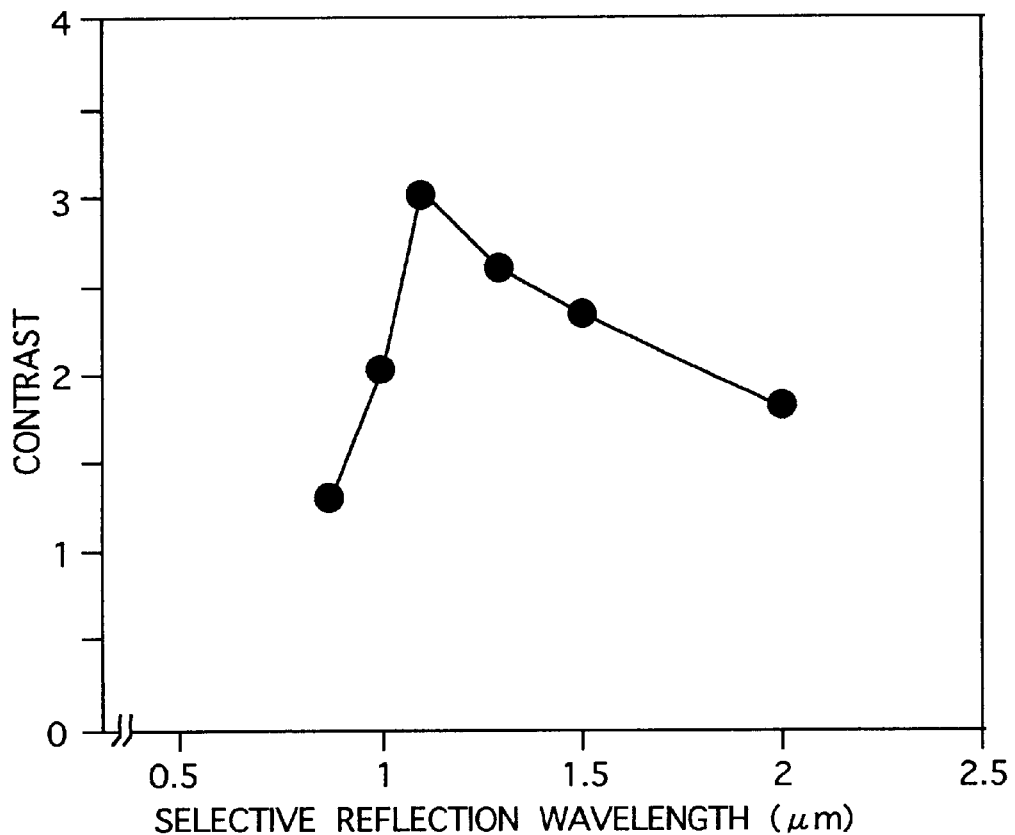
FIG. 9 shows an example of a relationship between a selective reflection wavelength of chiral nematic liquid crystal and a contrast of the second type liquid crystal element according to the invention.

From the Table 2 and FIG. 9, the following can be understood. According to the examples 2-1 to 2-4 of the invention in which the liquid crystal having cholesteric characteristics is in a range from 1.0 μm to 1.5 μm, the contrast is 2 or more, and is superior to that of the comparative examples 2-1 and 2-2 in which the selective reflection wavelength is shorter than 1.0 μm or longer than 1.5 μm.

Examples of the embodiments of the third liquid crystal element will be described below.

EXAMPLE 3-1

A chiral ingredient S-811 (Merck Co., Ltd.) was mixed at a rate of 17.8% by weight with a material formed of tolane liquid crystal MN1000XX (Chisso Co., Ltd.) and cyanobiphenyl liquid crystal E44 (Merck Co., Ltd.) having nematic characteristics and added thereto at a ratio of 80:20 (MN1000XX: E44=80:20), so that a chiral nematic liquid crystal having a selective reflection wavelength of 1.1 μm was prepared. The liquid crystal MN1000XX contains tolane liquid crystal having nematic characteristics and pyrimidine liquid crystal having nematic characteristics. The liquid crystal thus prepared was mixed at a rate of 84:16 with resin material for holding the liquid crystal (liquid crystal: resin material=84:16). This resin material was prepared by adding multi-functional acrylate derivative, i.e., bifunctional acrylate monomer HDDA (Nippon Kayaku Co., Ltd.) at a rate of 90:10 to o-phenylphenyl oxyethyl acrylate monomer expressed by the foregoing structural formula (1) (o-phenylphenyl oxyethyl acrylate monomer: HDDA= 90:10), and further adding thereto photo-polymerization initiator DAROCUR 1173 (Ciba-Geigy Co., Ltd.) at 10% by weight.

If o-phenylphenyl oxyethyl acrylate monomer is used as the resin material, various kinds of multi-functional acrylate derivative may be selected as a material mixed therewith provided that it is acrylate monomer having two or more functional groups. General groups such as aromatic rings, carbon hydride, OH groups, CO groups and COO groups may be arranged between functional groups, i.e., at portions not occupied by the functional groups.

The mixture thus prepared was applied to a transparent glass plate coated with a transparent electrode layer, and another transparent glass plate having another transparent electrode layer was laid over them with resin spacers of 20 μm in thickness therebetween. Ultraviolet rays were irradiated thereto at 13 mw/cm² for 5 minutes. As a result of the irradiation, phase-separation occurred, and an opaque liquid crystal element was prepared. During polymerization, the mixture of the liquid crystal and the resin material was kept at a temperature not exceeding 30° by air-cooling.

A black absorber layer is arranged on a plate at the side opposite to the light incident side.

A pulse voltage (10 msec) of 160 V was applied to this liquid crystal element, so that the liquid crystal element attained a planar orientation and therefore a transparent state exhibiting a black appearance owing to the absorber layer. In this state, the Y-value was 4.38, and this state was kept thereafter. Further, a pulse voltage (10 msec) of 80 V was applied to the liquid crystal element in this state, so that it attained the focal-conic orientation and therefore a scattering opaque state, and exhibited the Y-value of 13.15. This state was kept thereafter. The contrast was 3.00.

EXAMPLE 3-2

A chiral ingredient S-811 (Merck Co., Ltd.) was mixed at a rate of 15.8% by weight with a material formed of tolane liquid crystal MN1000XX (Chisso Co., Ltd.) and PCH liquid crystal S-1115 (Merck Co., Ltd.) having nematic characteristics and added thereto at a ratio of 90:10 (MN1000XX: S-1115=90:10), so that a chiral nematic liquid crystal having a selective reflective wavelength of 1.1 μm was prepared. Under the same conditions as those in the example 3-1, the liquid crystal thus prepared was mixed with a resin material, and the phase-separation was performed in the above mixture retained between a pair of plates. As a result of the pulse separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 3.83. After the cease of low voltage application, the liquid crystal element exhibited a Y-value of 11.57. The contrast was 3.02.

EXAMPLE 3-3

A chiral ingredient S-811 (Merck Co., Ltd.) was mixed at a rate of 15.5% by weight with a material formed of tolane liquid crystal MN1000XX (Chisso Co., Ltd.) and CCH liquid crystal S-1184 (Merck Co., Ltd.) having nematic characteristics and added thereto at a ratio of 90:10, so that a chiral nematic liquid crystal having a selective reflective wavelength of 1.1 μm was prepared. Under the same conditions as those in the example 3-1, the liquid crystal thus prepared was mixed with a resin material, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 3.67. After the cease of low voltage application, the liquid crystal element exhibited a Y-value of 11.56. The contrast was 3.15.

EXAMPLE 3-4

The same liquid crystal as that in the example 3-1 was used. The resin material was prepared by adding bifunctional acrylate monomer HDDA (Nippon Kayaku Co., Ltd.) at a rate of 90:10 to o-phenylphenyl dioxyethyl acrylate monomer, and further adding thereto photo-polymerization initiator DAROCUR 1173 (Ciba-Geigy Co., Ltd.) at 10% by weight. Under the same conditions as those in the example 3-1, the liquid crystal thus prepared was mixed with a resin material, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the embodiment 3-1. After the cease of high voltage application, the liquid crystal element exhibited a Y-value of 6.39. After the cease of low voltage application, the liquid crystal element exhibited a Y-value of 14.70. The contrast was 2.30.

EXAMPLE 3-5

The same liquid crystal as that in the example 3-1 was used. The resin material was prepared by adding bifunctional acrylate monomer PEG400DA (Nippon Kayaku Co., Ltd.) at a rate of 90:10 to o-phenylphenyl oxyethyl acrylate monomer, and further adding thereto photo-polymerization initiator DAROCUR 1173 (Ciba-Geigy Co., Ltd.) at 10% by weight. Under the same conditions as those in the example 3-1, the liquid crystal thus prepared was mixed with a resin material, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 4.95. After the cease of low voltage application, the liquid crystal element exhibited a Y-value of 12.6. The contrast was 2.55.

EXAMPLE 3-6

The same liquid crystal as that in the example 3-1 was used. The resin material was prepared by adding bifunctional acrylate monomer HX220 (Nippon Kayaku Co., Ltd.) at a rate of 90:10 to o-phenylphenyl oxyethyl acrylate monomer, and further adding thereto photo-polymerization initiator DAROCUR 1173 (Ciba-Geigy Co., Ltd.) at 10% by weight. Under the same conditions as those in the example 3-1, the liquid crystal thus prepared was mixed with a resin material, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 3.4. After the cease of low voltage application, the liquid crystal element exhibited a Y-value of 9.28. The contrast was 2.73.

EXAMPLE 3-7

The same liquid crystal as that in the example 3-1 was used. The resin material was prepared by adding trifunctional acrylate monomer THE330 (Nippon Kayaku Co., Ltd.) at a rate of 90:10 to o-phenylphenyl oxyethyl acrylate monomer, and further adding thereto photo-polymerization initiator DAROCUR 1173 (Ciba-Geigy Co., Ltd.) at 10% by weight. Under the same conditions as those in the example 3-1, the liquid crystal thus prepared was mixed with a resin material, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 4.6. After the cease of low voltage application, the liquid crystal element exhibited a Y-value of 13.31. The contrast was 2.89.

EXAMPLE 3-8

The liquid crystal and resin material used in this example were the same as those in the example 3-1. However, the polymerizable composition, i.e., the resin material was prepared by adding bifunctional acrylate monomer HDDA (Nippon Kayaku Co., Ltd.) at a rate of 80:20 to o-phenylphenyl oxyethyl acrylate monomer. Under the same conditions as those in the example 3-1, the liquid crystal thus prepared was mixed with a resin material, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 8.21. After the cease of low voltage application, the liquid crystal element exhibited a Y-value of 17.95. The contrast was 2.19.

EXAMPLE 3-9

The liquid crystal and resin material used in this example were the same as those in the example 3-1. The liquid crystal thus prepared was mixed with a resin material similarly to the example 3-1 except for that the mixing rate between the liquid crystal and the resin material was 88:12, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 3.36. After the cease of low voltage application, the liquid crystal element exhibited a Y-value of 10.91. The contrast was 3.25.

EXAMPLE 3-10

The liquid crystal and resin material used in this example were the same as those in the example 3-1. The liquid crystal thus prepared was mixed with a resin material similarly to the example 3-1 except for that the mixing rate between the liquid crystal and the resin material was 87:13, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 3.27. After the cease of low voltage application, the liquid crystal element exhibited a Y-value of 13.03. The contrast was 3.98.

Comparative Example 3-1

The liquid crystal and resin material used in this example were the same as those in the example 3-1. The liquid crystal thus prepared was mixed with a resin material similarly to the example 3-1 except for that the mixing rate between the liquid crystal and the resin material was 90:10. The mixture was retained between a pair of plates. Ultraviolet rays were irradiated thereto at 13 mw/cm$^2$ for 5 minutes similarly to the example 3-1; however, the resin material was not cured.

Comparative Example 3-2

The liquid crystal and resin material used in this example were the same as those in the example 3-1. However, the polymerizable composition, i.e., the resin material was prepared by adding bifunctional acrylate monomer HDDA (Nippon Kayaku Co., Ltd.) at a rate of 95:5 to o-phenylphenyl oxyethyl acrylate monomer (o-phenylphenyl oxyethyl acrylate monomer: HDDA=95:5). The liquid crystal thus prepared was mixed with a resin material similarly to the example 3-1, and was retained between a pair of plates. Ultraviolet rays were irradiated thereto at 13 mw/cm$^2$ for 5 minutes similarly to the example 3-1; however, the resin material was not cured.

Comparative Example 3-3

The liquid crystal and resin material used in this example were the same as those in the example 3-1. However, the polymerizable composition, i.e., the resin material was prepared by adding bifunctional acrylate monomer HDDA (Nippon Kayaku Co., Ltd.) at a rate of 70:30 to o-phenylphenyl oxyethyl acrylate monomer. The liquid crystal thus prepared was mixed with a resin material similarly to the example 3-1, and the phase-separation was performed in the above mixture retained between a pair of plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 8.54. After the cease of low voltage application, the liquid crystal element exhibited a Y-value of 14.01. The contrast was 1.64.

Comparative Example 3-4

The liquid crystal used in this example was the same as that in the example 3-1. The resin material was made of only o-phenylphenyl oxyethyl acrylate monomer. The liquid crystal thus prepared was mixed with a resin material similarly to the example 3-1, and was retained between a pair of plates. Ultraviolet rays were irradiated thereto at 13 mw/cm$^2$ for 5 minutes similarly to the example 3-1; however, the resin material was not cured.

Comparative Example 3-5

The liquid crystal used in this example was the same as that in the example 3-1. The resin material was made of only bifunctional acrylate monomer HDDA(Nippon Kayaku Co., Ltd.). The liquid crystal thus prepared was mixed with a resin material similarly to the example 3-1, and was retained between a pair of plates. The phase-separation was performed in the above mixture retained between the plates. As a result of the phase separation, an opaque liquid crystal element was prepared. Two kinds of, i.e., high and low pulse voltages were applied to this liquid crystal element under the same conditions as those in the example 3-1. After the cease of high voltage application, the liquid crystal element exhibited a Y-value of 18.88. After the cease of low voltage application, the liquid crystal element exhibited a Y-value of 19.06. The contrast was 1.01.

In connection with the liquid crystal elements of the examples 3-1 to 3-10 and the comparative examples 3-1 to 3-5, the following Table 3 represents the materials of the composite layers, mixing rates between the monomer of the compound in the resin material expressed by the foregoing structural formula (1) and multi-functional acrylate derivative monomer, mixing rates between the liquid crystal and the resin material, Y-values in the transparent state, Y-values in the scattering state and contrasts.

As can be understood from the above, the liquid crystal elements of the examples 3-1 to 3-10 of the invention can exhibit contrast values of 2 or more and therefore can achieve good contrast. However, the resin material was not cured in the comparative example 3-4 in which the resin material was made of only o-phenylphenyl oxyethyl acrylate monomer (i.e., compound expressed by the foregoing structural formula (1)), the comparative example 3-2 in which the mixing rate between the o-phenylphenyl oxyethyl acrylate monomer and the HDDA monomer was 95:5 (outside a range from 90:10 to 80:20), and the comparative example 3-1 in which the mixing rate between the liquid crystal and the resin material was 90:10 (outside a range from 88:12 to 80:20). Further, in the comparative example 3-5 in which the resin material was made of only HDDA monomer (multi-functional acrylate derivative), and in the comparative example 3-3 in which the mixing rate between the o-phenylphenyl oxyethyl acrylate monomer and the HDDA monomer was 70:30 (outside a range from 90:10 to 80:20), the resin material was cured and the phase-separation occurred, but the produced liquid crystal element exhibited insufficient contrast values lower than 2.

In the liquid crystal element having the composite layer including the resin matrix and the liquid crystal having cholesteric characteristics, the resin material is made of a mixture of the compound expressed by the foregoing structural formula (1) and the multi-functional acrylate. Particularly, the mixing rate (weight ratio) between the liquid crystal having cholesteric characteristics and the resin material is in a range from 88:12 to 80:20. Also, the mixing rate (weight ratio) between the foregoing compound and the multi-functional acrylate is in a range from 90:10 to 80:20. Thereby the liquid crystal element prepared in this manner exhibits good contrast, as can be understood from the above description.

TABLE 3

|        | LC     | CM | Resin M/M  | M/R   | L/M   | Y (t) | Y (s)     | CT   |
|--------|--------|----|------------|-------|-------|-------|-----------|------|
| E 3-1  | MN/E44 | S8 | o-p/HDDA   | 90:10 | 84:16 | 4.38  | 13.15     | 3.00 |
| E 3-2  | MN/S15 | S8 | o-p/HDDA   | 90:10 | 84:16 | 3.83  | 11.57     | 3.02 |
| E 3-3  | MN/S84 | S8 | o-p/HDDA   | 90:10 | 84:16 | 3.67  | 11.56     | 3.15 |
| E 3-4  | MN/E44 | S8 | o-p/d/HDDA | 90:10 | 84:16 | 6.39  | 14.70     | 2.30 |
| E 3-5  | MN/E44 | S8 | o-p/PEG400 | 90:10 | 84:16 | 4.95  | 12.6      | 2.55 |
| E 3-6  | MN/E44 | S8 | o-p/HX220  | 90:10 | 84:16 | 3.4   | 9.28      | 2.73 |
| E 3-7  | MN/E44 | S8 | o-p/THE330 | 90:10 | 84:16 | 4.6   | 13.31     | 2.89 |
| E 3-8  | MN/E44 | S8 | o-p/HDDA   | 80:20 | 84:16 | 8.21  | 17.95     | 2.19 |
| E 3-9  | MN/E44 | S8 | o-p/HDDA   | 90:10 | 88:12 | 3.36  | 10.91     | 3.25 |
| E 3-10 | MN/E44 | S8 | o-p/HDDA   | 90:10 | 87:13 | 3.27  | 13.03     | 3.98 |
| CE 3-1 | MN/E44 | S8 | o-p/HDDA   | 90:10 | 90:10 |       | not cured |      |
| CE 3-2 | MN/E44 | S8 | o-p/HDDA   | 95:5  | 84:16 |       | not cured |      |
| CE 3-3 | MN/E44 | S8 | o-p/HDDA   | 70:30 | 84:16 | 8.54  | 14.01     | 1.64 |
| CE 3-4 | MN/E44 | S8 | o-p/HDDA   | 100:0 | 84:16 |       | not cured |      |
| CE 3-5 | MN/E44 | S8 | o-p/HDDA   | 0:100 | 84:16 | 18.88 | 19.06     | 1.01 |

LC: material of liquid crystal
CM: chiral ingridient
Resin M/M: resin material monomer
M/R: rate of monomer
L/M: ratio between liquid crystal and monomer
Y (t): Y-value in transparent state
Y (s): Y-value in scattering state
CT: contrast
E: example
CE: comparative example
MN/E44: MN1000XX + E44
MN/S15: MN1000XX + S-1115
MN/S84: MN1000XX + S-1184
S8: S-811
o-p/HDDA: o-phenylphenyl oxyethyl acrylate + HDDA
o-p/d/HDDA: o-phenylphenyl dioxyethyl acrylate + HDDA
o-p/PEG400: o-phenylphenyl oxyethyl acrylate + PEG400DA
o-p/HX220: o-phenylphenyl oxyethyl acrylate + HX220
o-p/THE330: o-phenylphenyl oxyethyl acrylate + THE330

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal element comprising:

a pair of substrates at least one of which is transparent; and a composite layer, which is retained between said pair of substrates, comprising a transparent resin matrix and a liquid crystal material having cholesteric characteristics, wherein said liquid crystal material reflects a light component having a wavelength in a range from 1.0 μm to 1.5 μm in a planar state.

2. The liquid crystal element as claimed in claim 1, wherein said liquid crystal material is formed of a mixture of a tolane liquid crystal material having nematic characteristics, a pyrimidine liquid crystal material having nematic characteristics, a cyanobiphenyl liquid crystal material having nematic characteristics and a chiral ingredient.

3. The liquid crystal element as claimed in claim 1, wherein said transparent resin matrix has a three-dimensional continuous mesh structure.

4. The liquid crystal element as claimed in claim 1, wherein a resin used in the transparent resin matrix is a photo-curing resin.

5. The liquid crystal element claimed in claim 4, wherein said composite layer is prepared by phase separation caused by irradiating light beams to a mixture of said liquid crystal material and at least one of a polymerizable monomer of said photo-curing resin and a polymerizable oligomer of said photo-curing resin.

6. A liquid crystal in accordance with claim 1, wherein a contract angle between the liquid crystal material and a resin used in the transparent resin matrix is 30° or less.

7. A liquid crystal element in accordance with claim 6, wherein said transparent resin matrix is formed by polymerizing of a mixture of a compound having the following formula (1) and a multi-functional acrylate derivative,

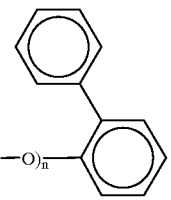

$$CH_2=CH-CO-O-(CH_2-CH_2-O)_n- \quad (1)$$

wherein n is a natural number from 1 to 2.

8. A liquid crystal in accordance with claim 1, wherein said liquid crystal material is a mixture of a nematic liquid crystal material and a chiral ingredient, and wherein said nematic liquid crystal material comprises a pyrimidine liquid crystal material.

9. A liquid crystal in accordance with claim 1, wherein said liquid crystal material further comprises a tolane liquid crystal material having nematic characteristics.

10. A liquid crystal in accordance with claim 1, wherein said a composite layer is composed so that a ratio of a spectral reflectance of said liquid crystal in a scattering state to a spectral reflectance of said liquid crystal in a transparent state yields a contrast greater than or equal to 2.

11. A liquid crystal element comprising:

a pair of substrates at least one of which is transparent; and a composite layer, which is retained between said pair of substrates, comprising a transparent resin matrix and a liquid crystal material having cholesteric characteristics, said liquid crystal material including at least two types of liquid crystal material, each of said at least two types of liquid crystal material having nematic characteristics;

wherein said liquid crystal material reflects a light component having a wavelength in a range from 1.0 μm to 1.5 μm in a planar state.

* * * * *

UNITED STATES PATENT AND TRADEMARK OFFICE
CERTIFICATE OF CORRECTION

PATENT NO.   : 6,124,908
DATED        : September 26, 2000
INVENTOR(S)  : Nobuyuki Kobayashi, Takuji Hatano, Masakazu Okada and Naoki Masazumi It is certified that error appears in the above-identified patent and that said Letters Patent is hereby corrected as shown below:

<u>Title page,</u>
Before the drawing, "13 Claims, 8 Drawing Sheets" was incorrectly printed as "11 Claims, 8 Drawing Sheets".

<u>Column 26,</u>
After claim 10, insert -- 11.  A liquid crystal in accordance with claim 1, wherein said liquid crystal material is capable of keeping at least first and second stable states without an electrical power application thereto. --.
Line 28, insert -- 12.   A liquid crystal in accordance with claim 1, wherein said liquid crystal material reflects a light component having a wavelength in a range from 1.1 to 1.3 $\mu$m. --.
Line 29, delete "11.", and insert -- 13. --.

Signed and Sealed this

Sixteenth Day of July, 2002

*Attest:*

*Attesting Officer*

JAMES E. ROGAN
*Director of the United States Patent and Trademark Office*